US010976266B2

(12) United States Patent
Pouliot et al.

(10) Patent No.: US 10,976,266 B2
(45) Date of Patent: Apr. 13, 2021

(54) APPARATUS AND METHOD FOR INSPECTING A POWER LINE

(71) Applicant: HYDRO-QUÉBEC, Montréal (CA)

(72) Inventors: Nicolas Pouliot, Montréal (CA); Gilles Rousseau, Anjou (CA); Marco Lepage, Saint-Marc-sur-Richelieu (CA); François Morin, Carignan (CA); Pierre-Luc Richard, Boucherville (CA); Eric Lavoie, Montréal (CA)

(73) Assignee: HYDRO-QUEBEC

( * ) Notice: Subject to any disclaimer, the term of this patent is extended or adjusted under 35 U.S.C. 154(b) by 306 days.

(21) Appl. No.: 16/301,878

(22) PCT Filed: Aug. 14, 2017

(86) PCT No.: PCT/CA2017/050959
§ 371 (c)(1),
(2) Date: Nov. 15, 2018

(87) PCT Pub. No.: WO2018/032095
PCT Pub. Date: Feb. 22, 2018

(65) Prior Publication Data
US 2019/0285557 A1 Sep. 19, 2019

Related U.S. Application Data

(60) Provisional application No. 62/376,657, filed on Aug. 18, 2016.

(51) Int. Cl.
*G01N 23/04* (2018.01)
*H02G 1/02* (2006.01)

(52) U.S. Cl.
CPC ............ *G01N 23/04* (2013.01); *H02G 1/02* (2013.01); *G01N 2223/313* (2013.01); *G01N 2223/646* (2013.01)

(58) Field of Classification Search
CPC ............ G01N 23/04; G01N 2223/313; G01N 2223/646; H02G 1/02
See application file for complete search history.

(56) References Cited

U.S. PATENT DOCUMENTS

| 2014/0126695 | A1* | 5/2014 | Stock | G01N 23/18 378/58 |
| 2015/0241365 | A1* | 8/2015 | Molenaar | G01N 23/083 228/104 |
| 2017/0011815 | A1* | 1/2017 | Pack | G01N 23/046 |

FOREIGN PATENT DOCUMENTS

| EP | 2405260 | 1/2012 |
| WO | 2006090877 | 8/2006 |

OTHER PUBLICATIONS

Toussaint, Kristopher et al, "Transmission Line Maintenance Robots Capable of Crossing Obstacles: State-of-the-Art Review and Challenges Ahead", Journal of Field Robotics 26(5), 477-499, Wiley Periodicals, Inc., www.interscience.wiley.com, 2009.

(Continued)

*Primary Examiner* — David P Porta
*Assistant Examiner* — Jeremy S Valentiner
(74) *Attorney, Agent, or Firm* — Norton Rose Fulbright Canada LLP

(57) ABSTRACT

An apparatus for inspecting a component of an aerial power line. A frame has a support member extending along a support member axis. The support member is mountable about the power line in proximity to the component. The support member is rotatable about the line axis upon being mounted about the power line. A stabilizing member is mountable to a stabilizing structure separate from the power line. The stabilizing member is mountable to the support member to rotate the support member about the line axis. A source of electromagnetic imaging energy is mounted to the support member and has an emitter to face the component.

(Continued)

A detector is mounted to the support member at a distance from the source to position the component between the source and the detector. The source and/or the detector is displaceable along the support member axis to vary the distance separating the detector and source.

16 Claims, 4 Drawing Sheets

(56) References Cited

OTHER PUBLICATIONS

Extended European Search Report from corresponding European application No. 17840660.9, dated Apr. 3, 2020.
"Non-Destructive Evaluation Technologies for Assessing Large River Crossing Conductors Prior to Restringing" presented at the International Conference on Condition Monitoring, Diagnosis and Maintenance in Oct. 2015 CMDM 2015 (3rd edition) Athénée Palace Hilton Hotel, Bucharest, Romania, Oct. 5-8, 2015.
"Digital X-Rays Pinpoint Problems", published in AltaLink in Dec. 2012.
"An Integrated Approach for Non-Destructive Testing of ACSR Conductors: Early Deployments of Robotized Sensors" published in IEEE, 2014.
International Search Report and the Written Opinion dated Nov. 2, 2017.

* cited by examiner

APPARATUS AND METHOD FOR INSPECTING A POWER LINE

CROSS-REFERENCE TO RELATED APPLICATIONS

This application is a 371 application of International application No. PCT/CA2017/050959 filed Aug. 14, 2017, which claims the priority of U.S. provisional patent application No. 62/376,657 filed Aug. 18, 2016, the entire contents of each of which are incorporated by reference herein.

TECHNICAL FIELD

The application relates generally to electrical power lines and, more particularly, to an apparatus and method for inspecting components of same.

BACKGROUND OF THE ART

It is sometimes necessary to inspect or monitor the components of electric power lines. Some conventional inspection techniques include visual observation, using a visual camera, and using an infrared camera. These techniques are not always suitable to determine whether the interior of a component being inspected has suffered damage or wear. In order to probe under the surface of these components, it is common to sample the component (i.e. by cutting of a piece for further in-lab investigation). To avoid this costly and tedious operation, inspection techniques with more penetrating power are used.

Some of these more penetrating inspection techniques involve using electromagnetic radiation, and in particular, X-radiation. Mounting X-ray equipment to an electrical power line, particularly one that is disposed high above the ground, is time-consuming and cumbersome, as fine adjustment and rigid mounting is required to obtain adequate and repetitive image generation. Furthermore, the technicians mounting the equipment to the power line may be exposed to radiation.

SUMMARY

In one aspect, there is provided an apparatus for inspecting a component of an aerial power line having a line axis, comprising: a frame having a support member extending along a support member axis between opposed ends, the support member being mountable about the power line in proximity to the component, the support member being rotatable about the line axis upon being mounted about the power line; a stabilizing member mountable to a stabilizing structure separate from the power line, the stabilizing member also being mountable to the support member to rotate the support member about the line axis; and a source of electromagnetic imaging energy mounted to the support member and having an emitter to face the component, and a detector of electromagnetic imaging energy mounted to the support member at a distance along the support member axis from the source to position the component between the source and the detector, at least one of the source and the detector being displaceable along the support member axis to vary the distance separating the detector and the source.

In an embodiment, at least the detector is displaceable along a second direction being transverse to the support member axis.

In an embodiment, at least the detector is displaceable along a third direction being transverse to the support member axis and to the second direction.

In an embodiment, the support member includes a support beam extending along the support member axis, and the frame includes a cross beam mounted to the support beam and being transverse thereto, the cross beam supporting the detector and having at least one hanger to mount the support beam directly to the power line.

In an embodiment, the cross beam is operable to displace the detector along a second direction being transverse to the support member axis, and the at least one hanger is operable to displace the detector along a third direction being transverse to the support member axis and to the second direction.

In an embodiment, the stabilizing member includes an upright support extending between a first end mountable to the support member, and a second end mountable to the stabilizing structure being located above the power line.

In an embodiment, a length of the upright support is adjustable to vary the distance between the first and second ends of the upright support, wherein upon mounting the upright support to the support member and the stabilizing structure, varying the distance between the first and second ends causes the upright support to rotate the support member about the line axis.

In an embodiment, the stabilizing member includes a stabilizing frame extending between a first end mountable to the support member, and a second end mountable to the stabilizing structure being located adjacent to the power line.

In an embodiment, the first end of the stabilizing frame includes two hooks mountable to the power line on either side of the component, and a bracket mounted to the hooks, a rod defining a rod axis extending through the bracket and through an aperture in the support member to mount the first end of the stabilizing frame to the support member, the support member being rotatable about the rod axis.

In an embodiment, the stabilizing member includes a motorized module mounted to the stabilizing structure being displaceable along the power line, the motorized module has a motor engaged with the support member to displace the support member along the support member axis.

In an embodiment, the motorized module has an output shaft being rotatable about an output shaft axis, the output shaft being engaged with the support member to rotate the support member about the output shaft axis.

In an embodiment, the source is operable to emit X-rays, the emitter having an X-ray filter to reduce an intensity of a given wavelength.

In an embodiment, the apparatus further comprises a transmitter mountable to the support member and in communication with the detector, the transmitter in operation receiving a digital image signal from the detector and transmitting a digital image of the component.

In an embodiment, in operation, the transmitter transmits the digital image wirelessly.

In another aspect, there is provided a method of inspecting a component of an aerial power line, comprising: positioning the component between a source of electromagnetic imaging energy and a detector of electromagnetic imaging energy; displacing at least one of the source and the detector along a direction being parallel to a line extending between the source and the detector, displacement of the source and/or detector varying a distance separating the source and the detector; and emitting electromagnetic imaging energy from the source toward the component, the detector receiving the electromagnetic imaging energy and generating a digital image of the component.

In an embodiment, displacing at least one of the source and the detector includes displacing at least the detector along a second direction being transverse to the line extending between the source and the detector.

In an embodiment, displacing at least the detector includes displacing at least the detector along a third direction being transverse to the line extending between the source and the detector, and being transverse to the second direction.

In an embodiment, positioning the component includes rotating at least the detector about a line axis of the power line.

In an embodiment, rotating at least the detector includes rotating the detector between a plurality of positions with respect to the component, and generating the digital image of the component at at least some of the positions.

In an embodiment, generating the digital image of the component includes generating a 2D image of the component at each of said positions, and reconstructing a 3D image from the 2D images.

In an embodiment, positioning the component includes supporting the source and the detector directly from the power line.

In an embodiment, positioning the component includes supporting the source and detector from a structure being separate from the power line.

In an embodiment, positioning the component includes raising or lowering at least the source to vary an angle of incidence of the electromagnetic imaging energy with the component.

In an embodiment, the method further comprises transmitting the digital image from the detector.

In an embodiment, emitting electromagnetic imaging energy from the source includes emitting X-rays.

DESCRIPTION OF THE DRAWINGS

Reference is now made to the accompanying figures in which.

DETAILED DESCRIPTION

Figure 1A:
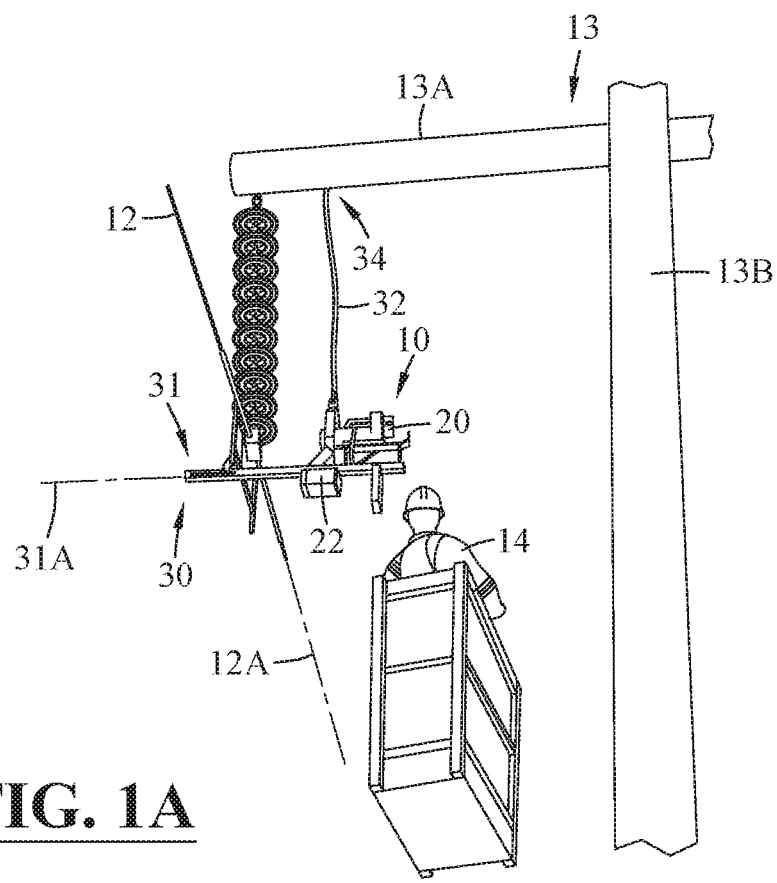
FIG. 1A is a perspective view of an apparatus for inspecting a component of an aerial power line, the apparatus being supported by an overhead stabilizing structure, according to an embodiment of the present disclosure.
Figure 1B:
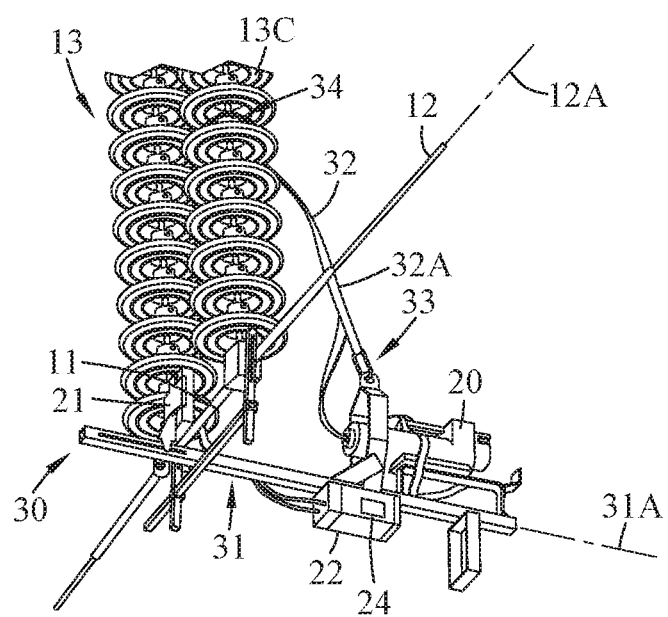
FIG. 1B is another perspective view of the apparatus of FIG. 1A, the apparatus being supported by a different overhead stabilizing structure.

FIGS. 1A and 1B illustrate an apparatus 10 for inspecting a component 11 of an aerial power line 12. The apparatus 10 is supported, directly or indirectly, by the aerial power line 12 (sometimes referred to herein simply as "line 12"), and by a stabilizing structure 13 that is spaced apart from and separate from the line 12. As will be explained in greater detail below, the apparatus 10 has inspecting equipment that allows for images and other data of the internal structure of the component 11 and/or the line 12 to be generated. The apparatus 10 therefore allows images of the interior of the component 11 to be generated, thereby permitting non-invasive and non-destructive inspection of the condition of the component 11 so as to uncover defects which might not be visually detectable.

In FIG. 1A, the line 12 is elevated from a ground surface. Line technicians 14 are therefore raised from the ground surface, or climb upward, to position them and the apparatus 10 in proximity to the component 11 in order to position the apparatus 10. The line 12 is a longitudinal body that extends along a line axis 12A. The term "power line" 12 is used herein to designate different kinds of electrical or utility lines 12. Some non-limiting examples of lines 12 of the present disclosure include energized lines 12 such as electricity transmission conductors, and non-energized lines 12.

The apparatus 10 is removably mounted to the line 12 such that a portion of its mass is directly supported by the line 12. In FIGS. 1A and 1B, the apparatus 10 is also directly supported from overhead by the stabilizing structure 13. In FIG. 1A, the stabilizing structure 13 is a cross-beam 13A of an electrical utility pole or tower 13B. In FIG. 1B, the line 12 is also elevated from the ground surface. The apparatus 10 is also directly supported from the overhead structure 13, which in FIG. 1B, is one of the electrical insulators 13C which support the line 12.

In FIGS. 1A and 1B, the component 11 to be inspected by the apparatus 10 is a suspension clamp supporting the line 12. It will be appreciated that the apparatus 10 disclosed herein can be used to inspect other components 11 of the line 12, including, but not limited to, mid-span or dead-end sleeves joining two segments of the line 12, spacers that maintain the right distances between adjacent lines 12, or parts of the cable or strands making up the line 12 itself. The apparatus 10 can therefore be mounted on various configurations of line 12, including but not limited to, single conductor, overhead ground wire, or bundles of two, three, four, or more conductors.

The imaging equipment of the apparatus 10 includes a source 20 of electromagnetic imaging energy and a detector 21 of electromagnetic imaging energy. The expression "electromagnetic imaging energy" refers to electromagnetic (EM) radiation that is not visible light, which is used to view the internal structure of component 11. An example of types of EM radiation that can be used with the apparatus 10 include ultraviolet rays. Indeed, the apparatus 10 can use any suitable ionizing radiation that is suitable for generating images of the interior of an object, including X-rays, gamma Rays, neutrons, and other particles. The ionizing source can be produced by an X-ray generator or an isotope such as selenium-75 and iridium-192.

In the embodiment of FIGS. 1A and 1B, the imaging equipment of the apparatus 10 is radiographic equipment.

Specifically, the imaging equipment of the apparatus 10 includes one or more sources 20 of X-rays, one or detectors 21 of X-rays, and a transmitter 22. The source 20 generates X-rays having any suitable wavelength, frequency, and/or energy. The X-rays are directed at the component 11 to be inspected. The detector 21 is positioned behind the component 11, such that the component 11 is between the source 20 and the detector 21. The detector 21 in operation absorbs the X-rays from the source 20 that are transmitted through the component 11, and generates an image of the interior of the component 11, or a digital image signal that is representative of the image or can be further processed to create same. In the depicted embodiment, the transmitter 22 is separate from the detector 21. In an alternate embodiment, the transmitter 22 is integral with the detector 21, such that the transmitter 22 and the detector 21 are one component or housed in a common casing. The transmitter 22 in operation transmits the digital image or the digital image signal to a user and/or review center which is remote from the apparatus 10. Appropriate viewer software can be executed by the transmitter 22, or by a processor remote from the apparatus (e.g. a mobile device on the ground, an image-processing center at another location, etc.), in order to view the internal image of the component 11. The transmission is performed wirelessly, using any suitable wireless network communication protocol (e.g. WiFi™). In an alternate embodiment, the transmitter 22 stores the digital image or digital image signal for later wired or wireless transmission and processing when the apparatus 10 is back at a service station.

The apparatus 10 also has a suitable power source 24 to provide electrical energy to any one of the source 20, the detector 21, and the transmitter 22. In the depicted embodiment, the power source 24 is mountable to the transmitter 22 and is thus portable with the apparatus 10. The power source 24 is one or more batteries. In an alternate embodiment, the power source 24 is supplied from a ground terminal, the line 12, the stabilizing structure 13, or any other connection that is separate from the apparatus 10.

Still referring to FIGS. 1A and 1B, the apparatus 10 also has a frame 30 which forms the corpus of apparatus 10 and provides structure thereto. In the depicted embodiment, the frame 30 is mountable to the line 12 and to the stabilizing structure 13, and supports the radiography equipment.

The frame 30 has a support member 31 which can be directly mounted to, and removed from, the line 12 so as to position the source 20 and the detector 21 in proximity to the component 11 such that component 11 is disposed between them. In an alternate embodiment, and as discussed in greater detail below, the support member 31 is indirectly mounted to the line 12. The support member 31 is an elongated body that extends along a support member axis 31A. The support member allows for the adjustment of the position one or both of the source 20 and the detector 21 to position the source 20 and/or detector 21 in the desired position for obtaining an image of the component 11. The support member 31 therefore allows for the translational displacement of one or both of the source 20 and the detector 21.

The apparatus 10 also has a stabilizing member 32 which is mountable to the stabilizing structure 13. More particularly, the stabilizing member 32 extends between a first end 33 which is removably mounted to the support member 31, and a second end 34 which is removably mounted to the stabilizing structure 13. In FIG. 1A, the second end 34 of the stabilizing member 32 is mounted to the cross-beam 13A of the utility pole 13B. In FIG. 1B, the second end 34 of the stabilizing member 32 is mounted to one of the electrical insulators 13C. The mounting of the stabilizing member 32 to the stabilizing structure 13 and to the support member 31 helps to provide stability to the frame 30.

The stabilizing member 32, or components thereof, are displaceable such that the support member 31 can be raised or lowered relative to the stabilizing structure 13. The raising and lowering of the support member 31 by the stabilizing member 32, in conjunction with the mounting of the support member 31 to the line 12, causes the support member 31, and thus the source 20 mounted thereto, to rotate about the line axis 12A. This pivoting or rotational movement helps to adjust the angle that the source 20 forms with the component 11. This allows for the desired X-ray incident angle with the component 11 to be selected, thereby contributing to generating digital images of the component 11 from the desired angle.

In both FIGS. 1A and 1B, the stabilizing member 32 includes an upright support 32A. The upright support 32A in FIGS. 1A and 1B is a strap 32A extending between the first end 33 mounted to the support member 31, and the second end 34 mounted to the stabilizing structure 13. The stabilizing member 32 is displaced by adjusting the length of the strap 32A. More particularly, when the length of the strap 32A is decreased, the support member 31 (and thus the source 20) is raised and brought closer towards the stabilizing structure 13. Similarly, when the length of the strap 32A is increased, the support member 31 is lowered and moved away from the stabilizing structure 13. When the support member 31 is raised and lowered, it rotates the support member 31 about its mounting with the line 12, and thus about the line axis 12A. This allows the line technician 14 to choose the desired orientation of the source 20 and/or detector 21. Other configurations for the upright support 32A are within the scope of the present disclosure. In an alternate embodiment, the upright support 32A includes a telescopic rod whose length can be increased or decreased. In another embodiment, a dial-indicator is provided for the angular value, and can be used by the line technician 14 as a reference for angle adjustment. It can thus be appreciated that the stabilizing member 32 contributes to the angular displacement of one or both of the source 20 and the detector 21.

Figure 2A:
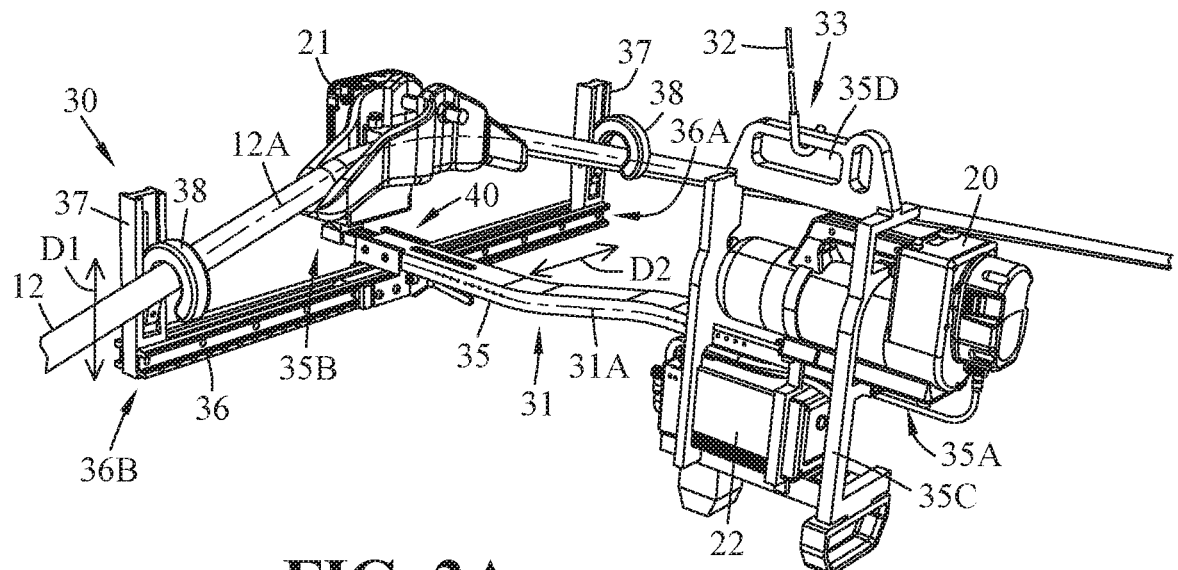
FIG. 2A is another perspective view of the apparatus of FIG. 1A.
Figure 2B:
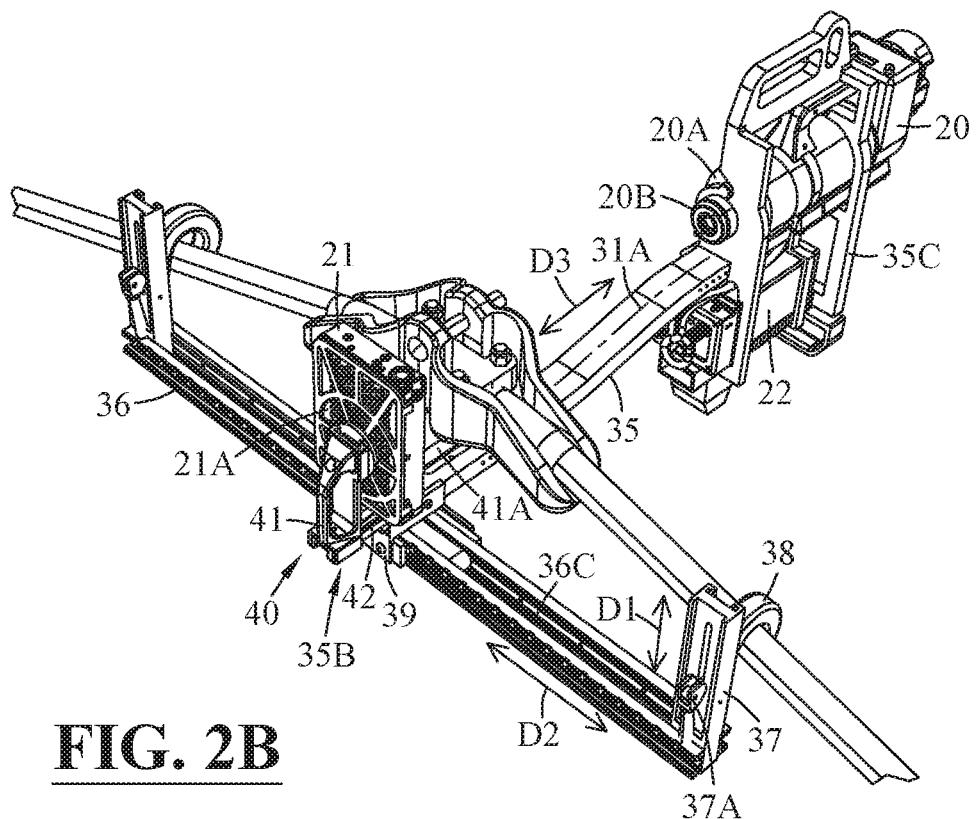
FIG. 2B is another perspective view of the apparatus of FIG. 1A.

FIGS. 2A and 2B also illustrate the frame 30. In the depicted embodiment, the support member 31 includes an elongated support beam 35 extending along the support member axis 31A between a first end 35A and a second end 35B. The source 20 and the transmitter 22 are mounted to the support beam 35 at the first end 35A thereof, and the detector 21 is mounted to the support beam 35 at the second end 35B thereof. It will be appreciated that the locations at which the source 20 and the detector 21 are mounted to the support beam 35 can be modified or reversed. The transmitter 22 is mounted to the first end 35A of the support beam 35 on an underside thereof. It will be appreciated that the transmitter 22 can also be mounted elsewhere on the support beam 35, and on the same side as the detector 21 and/or source 20.

The source 20 and the transmitter 22 are each disposed within a protective jacket 35C which protects the source 20 and the transmitter 22 from impacts, and can also serves as a stable stand. The protective jacket 35C for the source 20 has a mounting hole 35D through which the first end 33 of the stabilizing member 32 can be mounted to the support member 31. The position of the protective jacket 35C at the first end 35A of the support beam 35 facilitates the angular adjustment and rotation of the support beam 35, and thus of the source 20, when the stabilizing member 32 is displaced to raise and lower the support member 31.

The frame 30 includes a cross beam 36 which is mounted to the support beam 35 and is transverse thereto. The cross beam 36 extends between a first end 36A and an opposed second end 36B. A hanger 37 is mounted to the cross beam 36 at each of the first and second ends 36A,36B and includes a hook 38 which is used to mount the cross beam 36, and thus the apparatus 10, directly to the line 12. The hanger 37 has an adjustment mechanism 37A to vertically displace each hook 38 relative to the cross beam 36 along direction D1 which is transverse to the support member axis 31A. In the depicted embodiment, the direction D1 is substantially vertical. The adjustment mechanism 37A of each hanger 37 allows the position of the hanger 37, and thus of the support member 31 and the source 20, to be raised and lowered.

The frame 30 has a bracket 39 mounted to the second end 35B of the support beam 35. The bracket 39 sits in a groove 36C in the cross beam 36. The bracket 39 is displaceable within the groove 36C along direction D2 between the first and second ends 36A,36B of the cross beam 36. The direction D2 is transverse to the support member axis 31A, and which is also transverse to the direction D1. In the depicted embodiment, the direction D2 is substantially parallel to the cross beam 36. The bracket 39 allows the position of the second end 35B of the support beam 35, and thus the position of the detector 21 at the second end 35B, to be moved in a lateral direction.

The vertical and lateral displacement of each hanger 37 allows for the position of the detector 21 relative to the component 11 to be adjusted. The line technicians are therefore able to position the support beam 35 (and therefore the source 20 and detector 21) as required with respect to the component 11 so as to obtain the desired image, allowing the apparatus 10 to be used with many different types and sizes of components 11. In other possible configurations, the entire cross beam 36, along with hangers 37 and hooks 38, can all rigidly slide with respect to support beam 35 in direction D2, thus maintaining a constant distance between hangers 37 but still allowing the source 20 and detector 21 to be correctly positioned with respect to the component 11. Although shown as substantially hollow extrusions, the support beam 35, cross beam 36, and hander 37 can have other configurations and take different forms, such as for example rods, angles, tubes, or other elongated support objects.

Still referring to FIGS. 2A and 2B, the source 20 has an emitter 20A which emits the X-rays in the direction of the component 11 and the detector 21. The emitter 20A is a passive and non-radioactive source of X-rays. The source 20 and/or emitter 20A has one or more X-ray filters 20B to reduce an intensity of a given wavelength of emitted X-rays. The filter 20B may be include a copper filter, and helps to mask the photons of X-rays that are less energetic. This may contribute to cleaning up the digital image or digital image signal generated by the detector 21, and thus contribute to improving the quality of the digital image of the component 11. The filter 20B allows for the optimal usage of a relatively less powerful, and thus less heavy, source 20 of X-rays to be used. The X-rays emitted by the emitter 20A and transmitted through the component 11 are absorbed by the detector 21, which in the depicted embodiment, includes a digital imaging plaque or plate 21A.

The imaging plate 21A is displaceable in direction D3 along the support beam 35 toward and away from the source 20 to vary the distance separating the plate 21A from the source 20, and/or from the component 11. Direction D3 is parallel to the support member axis 31A, and transverse to directions D1 and D2. The displacement of the plate 21A in direction D3 helps to bring the plate 21A in close proximity to the component 11, which helps to generate better digital images of the interior of the component 11. Typically, better quality digital images are produced when the detector 21 is as close as possible to the component 11. The source 20 can also be displaced in direction D3 along the support beam 35 toward and away from the plate 21A in order to optimize the X-Ray coverage of component 11.

In the depicted embodiment, the displacement of the plate 21A in direction D3 is achieved with a sliding mechanism 40. The sliding mechanism 40 includes a bracket 41 mounted to the plate 21A and displaceable along the direction D3, by means of a supporting rail 42. The supporting rail 42 is telescopically mounted within the support beam 35 and displaceable along direction D3 relative to the support beam 35. The bracket 41 in the depicted embodiment is biased outwardly (i.e. away from the first end 35A of the support beam 35) so that the plate 21A mounted to the bracket 41 is by default disposed furthest away from the source 20. This provides a relatively large distance between the detector 21 and the source 20, which facilitates the initial positioning of the apparatus 10 so that the component 11 is between the source 20 and the detector 21. This default position of the detector 21 can help the line technician to mount the apparatus 10 to inspect different types and sizes of components 11. The biasing of the bracket 41 in the depicted embodiment is achieved with an internal constant-force spring 41A of the sliding mechanism 40 in engagement with the bracket 41. Other biasing configurations are possible. When the frame 30 is in position on the line 12 and supported by the overhead structure, the line technician can manually move the plate 21A with a rod or other object toward the component 11. The sliding mechanism 40 facilitates the displacement of the plate 21A toward the component 11 such that it may enter into contact with the component 11.

Once the apparatus 10 is properly installed on the line 12 to image the component 11, the line technicians can climb down or be lowered to the ground, or at some distances considered safe, allowing them to keep a safe distance away from apparatus 10. The line technicians can then remotely activate the source 20 and obtain a digital image of the interior of the component 11 from the transmitter 22 relatively quickly.

Figure 3A:
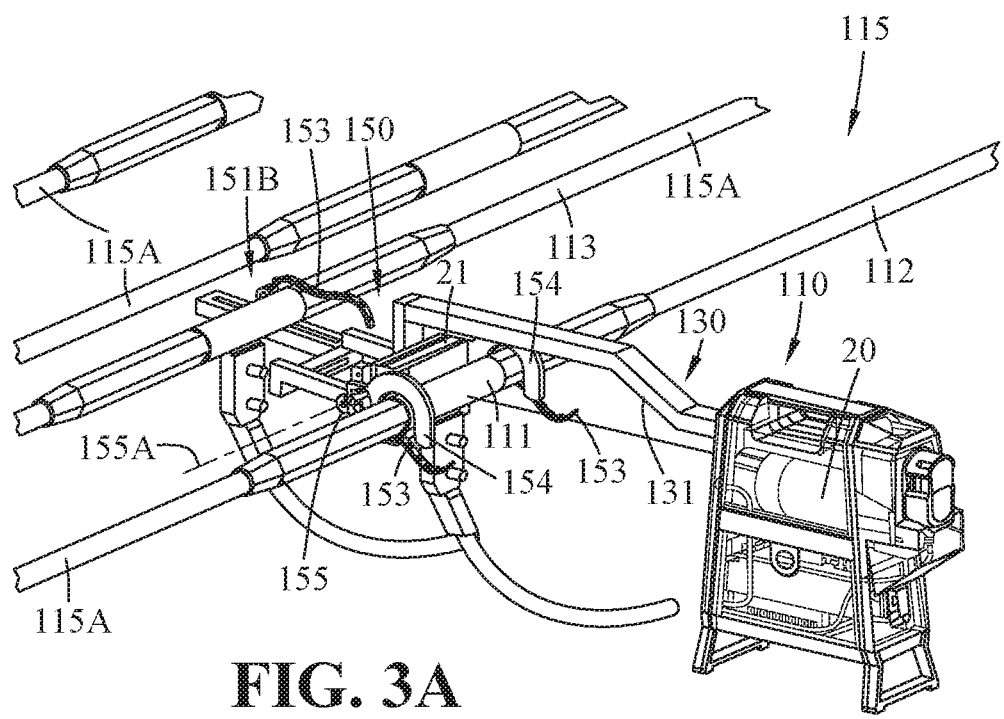
FIG. 3A is a perspective view of an apparatus for inspecting a component of an aerial power line, according to another embodiment of the present disclosure.
Figure 3B:
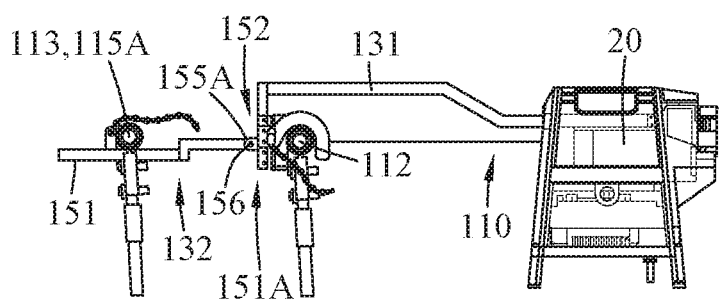
FIG. 3B is a side elevational view of the apparatus of FIG. 3A.
Figure 3C:
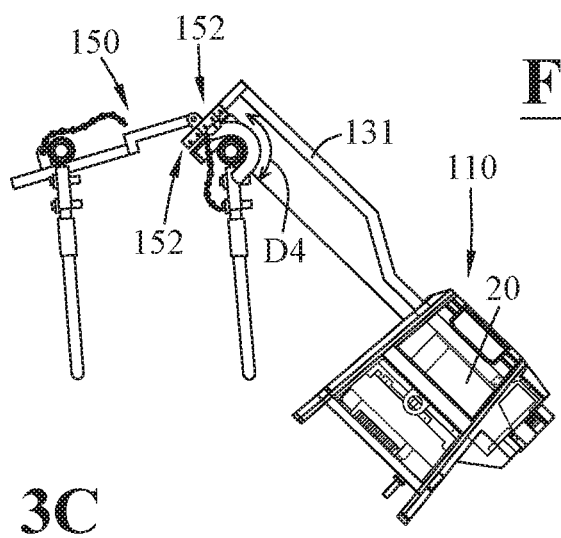
FIG. 3C is another side elevational view of the apparatus of FIG. 3A.

FIGS. 3A to 3C show another embodiment of the apparatus for inspecting the component 111 of the power line 112, i.e., the apparatus 110. The component 111 in the depicted embodiment is a sleeve joining two segments of the line 112. The apparatus 110 is shown being used on a quadruple bundle 115 of four conductors 115A, one of which is the power line 12 to be inspected. In the depicted embodiment, it is not possible to rely on an overhead stabilizing structure 13 to partially support the apparatus 110. Instead, the stabilizing structure 113 is another one of the conductors 115A whose components are not being inspected by the apparatus 110. In the depicted embodiment, the stabilizing structure 113 is the conductor 115A in the same horizontal plane as the power line 112 being inspected, this conductor 115A being immediately next to the power line 112.

The stabilizing member 132 of the apparatus 110 includes a stabilizing frame 150 which is mounted to the frame 130, and also mounted to the adjacent conductor 115A that is not being inspected, to provide support and stability to the apparatus 110. The stabilizing frame 150 includes an extendable rod 151 extending between a first end 151A mountable to the line 112, and a second end 151B mountable to the adjacent conductor 115A. The rod 151 is extensible and retractable in length, thereby allowing the length of the stabilizing frame 150 to be adjusted so that it can be mounted to conductors 115A spaced any suitable distance apart from each other. A second end 151B of the rod 151 has a rapid attachment 153, in this embodiment a hook-and-loop fastener, to attach the rod 151 to the other support conductor 115A. The stabilizing frame 150 can have other rapid attachments 153 to ensure proper attachment to the line 112.

The stabilizing frame 150 includes a bracket 152 mounted to hooks 154. Each of the hooks 154 is mounted directly onto the line 112 on opposite sides of the component 111. A rubber-like coating of the supporting hooks 154 contributes to improving the stability/rigidity of their grip with the line 112. A connecting rod 155 defining a rod axis 155A extends through the bracket 152 and between an aperture 156 in a remote, distal end 135B of the support member 131. The connecting rod 155 connects the bracket 152, and thus the stabilizing frame 150, to the support member 131. The mounting of the bracket 152 to the support member 131 allows the support member 131 to rotate in direction D4 about the rod axis 155A in order to adjust the incident angle of the source 20 with respect to the component 111, as appears by comparing FIGS. 3B and 3C. The rotation of the support member 131 also allows the orientation of the detector 21 with respect to the component 111 to be modified. The orientation of the support member 131 can be fixed in a desired position. The support member 131 is also displaceable along the support member axis 131A to displace the detector 21 and thus vary its distance from the source 20.

Figure 4A:
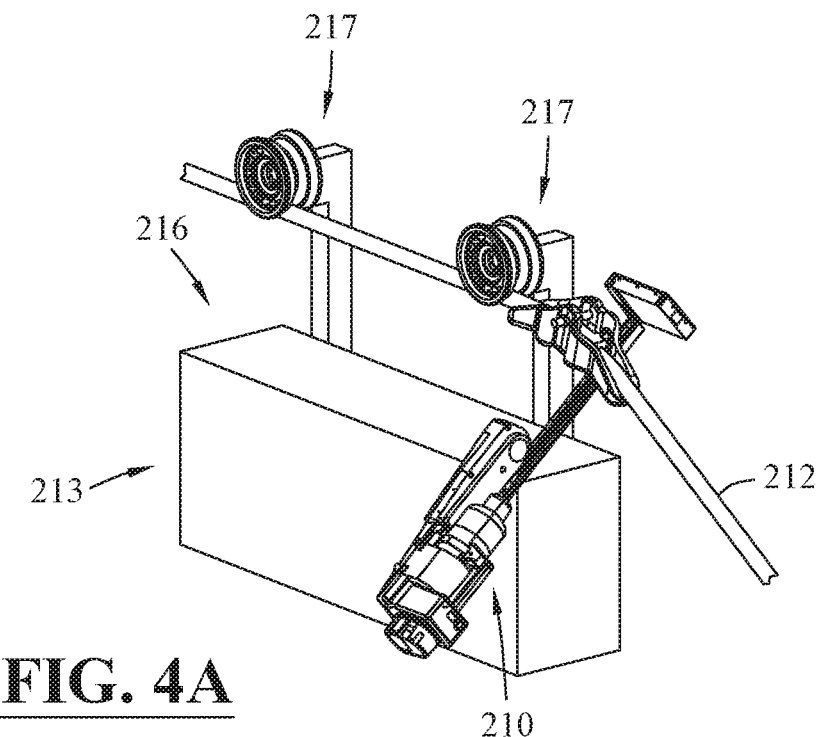
FIG. 4A is a perspective view of an apparatus for inspecting a component of an aerial power line, according to yet another embodiment of the present disclosure.
Figure 4B:
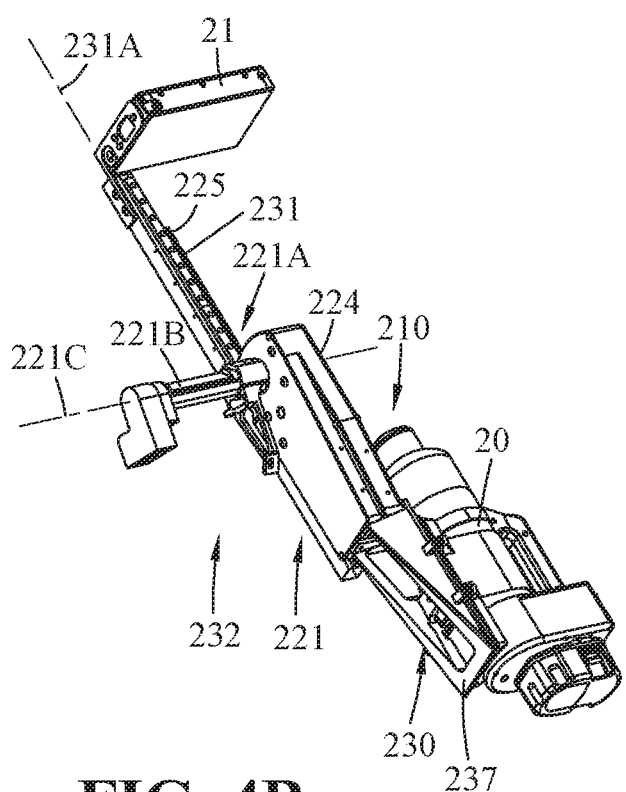
FIG. 4B is a perspective view of the apparatus of FIG. 4A.
Figure 5:
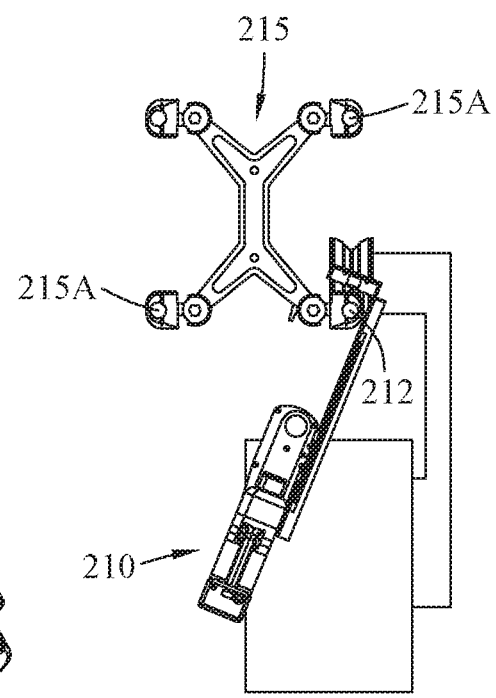
FIG. 5 is an end view of the apparatus of FIG. 4A, the apparatus being supported by a different stabilizing structure.

FIGS. 4A to 5 show another embodiment of the apparatus 210. The apparatus 210 is shown being used on a single conductor 215A or line 212 (FIG. 4A), or on one of the lines 212 of a quadruple bundle 215 of conductors 215A (FIG. 5). In the depicted embodiment, the stabilizing structure 213 is suspended directly from the line 212 and is displaceable along the line 212. The stabilizing structure 213 is a robot 216 suspended from the line 212 by motorized wheels 217. The robot 216 is a self-deployable structure that is motorized. It can be remotely-operated from the line 212 by the line technician 14 from the ground, such that the line technician 14 does not need to manually position the source 20 and the detector 21.

The stabilizing member 232 is mounted to the robot 216. The apparatus 210 is therefore indirectly supported by the line 212. The stabilizing member 232 has a motorized module 221 that is mounted to the frame 230 of the apparatus 210. The frame 230 in the depicted embodiment includes a bracket 237 for supporting the source 20, and a displaceable support member 231 supporting the detector 21. The depicted embodiment of the motorized module 221 includes a motor 221A housed within a motor housing 224. The motor 221A operates on grooves or racks 225 in the support member 231 such that operation of the motor 221A causes the support member 213 (and the detector 21 mounted to a distal extremity thereof) to displace toward and away from the source 20 along the support member axis 231A. In an alternate embodiment, the support member 231 displaces the source 20 instead of the detector 21. The motorized module 221 can also provide angular adjustment of the source 20 and/or detector 21. More particularly, in the depicted embodiment, the motorized module 221 has an output shaft 221B that is rotatable about an output shaft axis 221C. The output shaft 221B is engaged into a corresponding cavity of the support member 231 to rotate the support member 231, and thus the detector 21, about the output shaft axis 221C, and thus about the line axis 12. This helps to position the source 20 and/or detector 21 in the desired orientation relative to the component 211. The movement of the detector 21 and/or source 21 between different positions relative to the component 211 facilitates the generation of 2D images of the interior of the component 211 at different angles or positions. This allows for a more complete 3D image of the component 211 to be reconstructed from these different 2D images. This functionality is also possible in other embodiments of the apparatus 10,110.

Referring to FIGS. 2A and 2B, there is disclosed a method of inspecting the component 11 of the aerial power line 12. The method includes positioning the component 11 between the source 20 and the detector 21. The method includes displacing at least one of the source 20 and the detector 21 along a direction being parallel to a line extending between the source 20 and the detector 21. The displacement of the source 20 and/or detector 21 varies the distance separating the source 20 and the detector 21. The method also includes emitting electromagnetic imaging energy from the source 20 toward the component 11. The detector 21 receives the electromagnetic imaging energy and generates a digital image of the component 11.

In light of the preceding, it can be appreciated that the apparatus 10,110,210 disclosed herein provides a relatively light-weight and portable radiography inspecting tool that can be relatively rapidly installed on the line to inspect a component thereof. The apparatus 10,110,210 therefore provides a non-invasive tool that helps to obtain information that can be useful in diagnosing electricity transmission lines, for example, without having to take a sample of the component or disassemble the transmission lines.

The apparatus 10,110,210 allows for angular and translational displacements that facilitate orienting the source of X-rays and/or the detector of X-rays to obtain the desired digital image of the component. Once the desired position of the apparatus is reached, securing the apparatus 10,110,210 onto the line is also possible for a good quality image, even in moderate windy conditions.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An apparatus for inspecting a component of an aerial power line having a line axis, comprising:
   a frame having a support member extending along a support member axis, the support member being mountable about the power line in proximity to the component, the support member being rotatable about the line axis upon being mounted about the power line;
   a stabilizing member mountable to a stabilizing structure separate from the power line, the stabilizing member also being mountable to the support member to rotate the support member about the line axis; and
   a source of electromagnetic imaging energy mounted to the support member and having an emitter to face the component, and a detector of electromagnetic imaging energy mounted to the support member at a distance along the support member axis from the source to position the component between the source and the detector, at least one of the source and the detector being displaceable along the support member axis to vary the distance separating the detector and the source, at least the detector being displaceable along a second direction being transverse to the support member axis, and along a third direction being transverse to the support member axis and to the second direction.

2. The apparatus as defined in claim 1, wherein the support member includes a support beam extending along the support member axis, and the frame includes a cross beam mounted to the support beam and being transverse thereto, the cross beam supporting the detector and having at least one hanger to mount the support beam directly to the power line.

3. The apparatus as defined in claim 2, wherein the cross beam is operable to displace the detector along the second direction being transverse to the support member axis, and the at least one hanger is operable to displace the detector along the third direction being transverse to the support member axis and to the second direction.

4. The apparatus as defined in claim 1, wherein the stabilizing member includes an upright support extending between a first end mountable to the support member, and a second end mountable to the stabilizing structure being located above the power line.

5. The apparatus as defined in claim 4, wherein a length of the upright support is adjustable to vary the distance between the first and second ends of the upright support, wherein upon mounting the upright support to the support member and the stabilizing structure, varying the distance between the first and second ends causes the upright support to rotate the support member about the line axis.

6. The apparatus as defined in claim 1, wherein the stabilizing member includes a motorized module mounted to the stabilizing structure, the motorized module being displaceable along the power line, the motorized module having a motor engaged with the support member to displace the support member along the support member axis.

7. The apparatus as defined in claim 6, wherein the motorized module has an output shaft being rotatable about an output shaft axis, the output shaft being engaged with the support member to rotate the support member about the output shaft axis.

8. The apparatus as defined in claim 1, wherein the source is operable to emit X-rays, the emitter having an X-ray filter to reduce an intensity of a given wavelength.

9. The apparatus as defined in claim 1, further comprising a transmitter mountable to the support member and in communication with the detector, the transmitter in operation receiving a digital image signal from the detector and transmitting a digital image of the component.

10. An apparatus for inspecting a component of an aerial power line having a line axis, comprising:
a frame having a support member extending along a support member axis between opposed ends, the support member being mountable about the power line in proximity to the component, the support member being rotatable about the line axis upon being mounted about the power line;
a stabilizing member mountable to a stabilizing structure separate from the power line, the stabilizing member also being mountable to the support member to rotate the support member about the line axis, the stabilizing member having a stabilizing frame extending between a first end mountable to the support member, and a second end mountable to the stabilizing structure located adjacent to the power line, the first end of the stabilizing frame having two hooks mountable to the power line on either side of the component, and a bracket mounted to the hooks, a rod defining a rod axis extending through the bracket and through an aperture in the support member to mount the first end of the stabilizing frame to the support member; and
a source of electromagnetic imaging energy mounted to the support member and having an emitter to face the component, and a detector of electromagnetic imaging energy mounted to the support member at a distance along the support member axis from the source to position the component between the source and the detector, at least one of the source and the detector being displaceable along the support member axis to vary the distance separating the detector and the source.

11. A method of inspecting a component of an aerial power line, comprising:
positioning the component between a source of electromagnetic imaging energy and a detector of electromagnetic imaging energy;
displacing at least one of the source and the detector along a direction being parallel to a line extending between the source and the detector, displacement of the source and/or detector varying a distance separating the source and the detector, at least the detector being displaceable along a second direction being transverse to the line extending between the source and the detector, and along a third direction being transverse to the support member axis and to the line extending between the source and the detector; and
emitting electromagnetic imaging energy from the source toward the component, the detector receiving the electromagnetic imaging energy and generating a digital image of the component.

12. The method as defined in claim 11, wherein positioning the component includes rotating at least the detector about a line axis of the power line.

13. The method as defined in claim 12, wherein rotating at least the detector includes rotating the detector between a plurality of positions with respect to the component, and generating the digital image of the component at at least some of the positions.

14. The method as defined in claim 13, wherein generating the digital image of the component includes generating a 2D image of the component at each of said positions, and reconstructing a 3D image from the 2D images.

15. The method as defined in claim 11, wherein positioning the component includes supporting the source and the detector directly from the power line.

16. The method as defined in claim 11, wherein positioning the component includes raising or lowering at least the source to vary an angle of incidence of the electromagnetic imaging energy with the component.

* * * * *